Sept. 8, 1953  M. O. NELSON  2,651,765
HAND LOCKING BATTERY CABLE CLAMPS
Filed Feb. 26, 1952  2 Sheets-Sheet 1
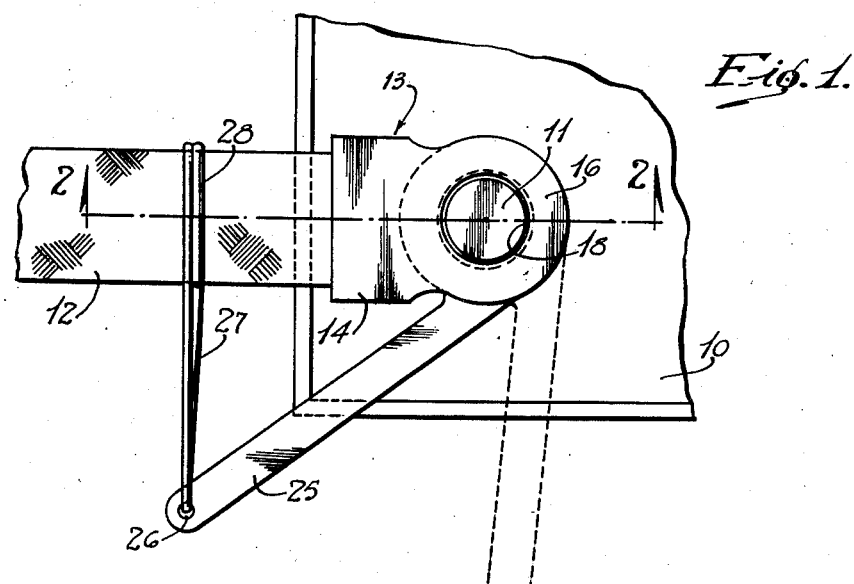
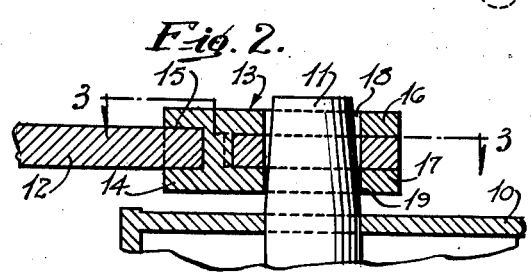
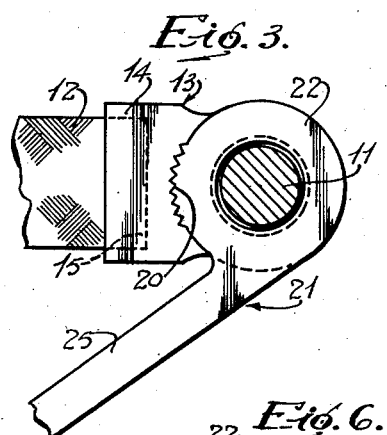
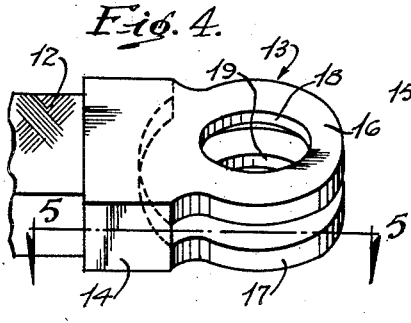
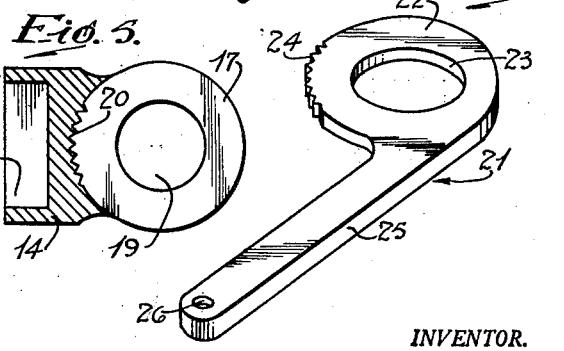
INVENTOR.
Melvin O. Nelson Sept. 8, 1953 M. O. NELSON 2,651,765
HAND LOCKING BATTERY CABLE CLAMPS
Filed Feb. 26, 1952 2 Sheets-Sheet 2
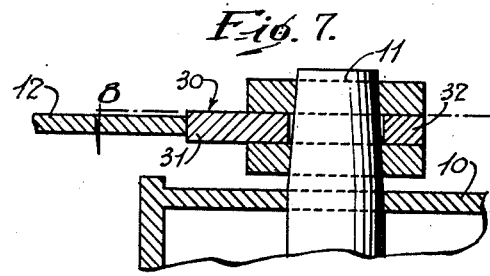
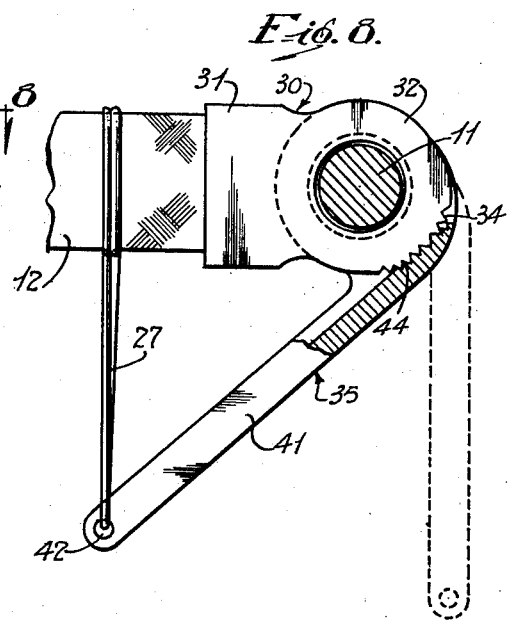
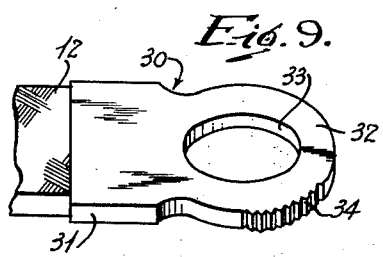
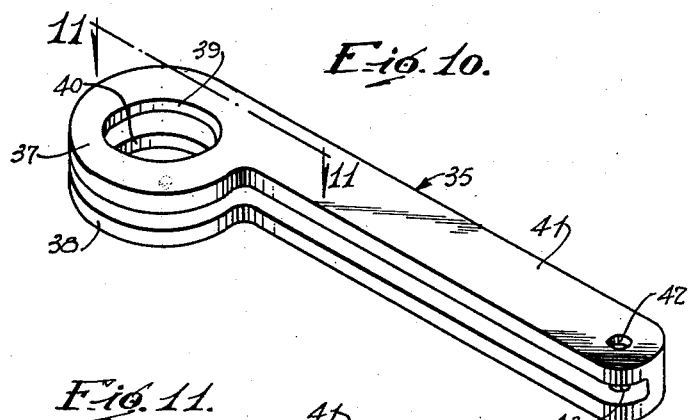
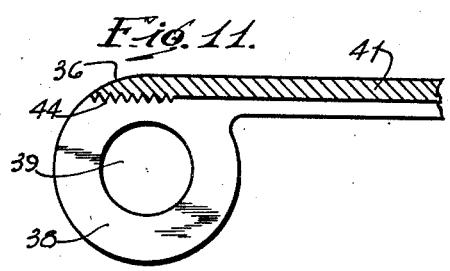
INVENTOR.
Melvin O. Nelson Patented Sept. 8, 1953

2,651,765

UNITED STATES PATENT OFFICE 2,651,765

HAND LOCKING BATTERY CABLE CLAMP

Melvin O. Nelson, Kansas City, Mo.

Application February 26, 1952, Serial No. 273,492

1 Claim. (Cl. 339—239)

The present invention relates to a hand locking battery cable clamp and it consists in the combinations, constructions and arrangements of parts herein described and claimed.

Generally there is provided a hand operated battery cable clamp in one form of which there is provided a ring-shaped member which is permanently connected to a cable and which member is adapted to be placed over the post or terminal of a storage battery. There is also provided as a part of this form of the invention a U-shaped locking member the legs of which are provided with registering apertures and between the legs of which is adapted to be inserted the ring shaped member heretofore referred to. The apertures in the ring shaped member and in the locking member all are adapted to receive the battery post and the locking member is provided with an elongated handle for turning the same. The ring shaped member is provided with a serrated eccentric portion upon its outer periphery which is adapted to engage a serrated portion upon the inner wall of the apex portion of the locking member when the handle of the same is turned. In another form of the invention the cable is connected to a U-shaped post engaging member while the locking device consists of a ring having a serrated outer edge portion which is eccentric to the aperture provided therein. A handle is also provided for the locking member in this case and in both forms of the invention the handle may be secured to the cable by means of a wire or the like which extends around the cable and through an opening provided adjacent the outer end of the handle.

The device is such that a battery cable may be quickly and easily connected or disconnected to or from a battery post or terminal by a simple manual manipulation of the handle of the locking portion above referred to.

It is accordingly an object of the invention to provide a simple hand-operated device for connecting battery cables to battery posts and like means for disconnecting the same therefrom.

Another object of the invention is to provide, in a device of the character described, novel locking means forming a part of the invention.

Still another object of the invention is to provide a novel handle retaining means forming a part of the invention.

A still further object of the invention is to provide a device of the character set forth which is simple in construction, inexpensive to manufacture and yet efficient and effective in use.

Other and further objects of the invention will become apparent from a reading of the following specification taken in conjunction with the drawings, in which:

Figure 1 is a plan view of an embodiment of the invention shown in position upon a battery terminal, Figure 2 is a fragmentary sectional view taken along line 2—2 of Figure 1, Figure 3 is a sectional view taken substantially along line 3—3 of Figure 2, Figure 4 is a fragmentary perspective view of a cable and terminal member as shown, for example, in Figures 1 and 2, Figure 5 is a fragmentary sectional view taken along line 5—5 of Figure 4, Figure 6 is a perspective view of a locking member forming a part of the device illustrated in Figures 1 to 3, inclusive, Figure 7 is a view similar to Figure 2 showing a modified form the invention may assume, Figure 8 is a sectional view taken substantially along line 8—8 of Figure 7, Figure 9 is a perspective view of a cable and terminal as illustrated, for example, in Figures 7 and 8, Figure 10 is a perspective view of a locking member utilized in the form of the invention shown in Figures 7 and 8, and Figure 11 is fragmentary sectional view taken along line 11—11 of Figure 10.

Referring more particularly to the drawings, there is shown therein a storage battery 10 and one of its posts 11. A cable 12 is provided with a U-shaped terminal 13 whose bight portion 14 encompasses the cable end, as indicated at 15, and whose legs 16 and 17 are generally circular in shape and each provided with an aperture 18 and 19, respectively.

The inner wall of the portion 14 is serrated, as indicated at 20. A locking member is generally indicated at 21 and is provided with a circular head 22 having an eccentrically located circular opening 23 therein and whose peripheral edge is partially serrated, as indicated at 24. A handle 25 is formed integrally with the head 22 and extends angularly therefrom and is provided adjacent its outer end with a drilled hole 26. A wire 27 encircles the inner portion of the cable 12, as indicated at 28, and thus extends through the hole 26 in the handle 25 and is connected to itself so as to become, in effect, endless.

In the operation of this form of the invention, it will be apparent that the locking member 21 is associated with the terminal member 13 by placing the head 22 between the legs 16 and 17 and aligning vertically the openings 18, 23 and 19. Thereupon the post 11 is inserted through the thus aligned openings and the handle 25 is moved in a clockwise direction as viewed, for example, in Figure 1 from the dotted line to the full line position. This brings the serrated portion 24 of the head 22 into engagement with the serrations 20 in the member 13, and, since the opening 23 is eccentrically positioned with respect to the head 22, the inner wall of the opening 23 will bind against the post 11 while at the same time the locking member 21 and the terminal member 13 will be effectively locked together. To release the device from the post 11, it is only necessary to move the handle 25 in a counterclockwise direction, again as viewed in Figure 1, thus reversing the process above referred to.

In that form of the invention illustrated in Figures 7 to 11, inclusive, there is provided in addition to the cable 12, battery 10 and battery post 11, a terminal generally indicated at 30 and which terminal comprises a base 31 which is securely affixed to the free end of the cable 12 and a substantially circular head 32 provided with an aperture 33 therethrough. The aperture 33 is circular but eccentric to the periphery of the head 32. The peripheral edge of the head 32 has a portion thereof which is serrated, as indicated at 34.

There is also provided a locking member which is generally indicated at 35, and which comprises a U-shaped member having a bight portion 36 and a pair of spaced parallel legs 37 and 38 each of which is generally circular in form. The legs 37 and 38 are respectively provided with circular openings 39 and 40. Integrally formed with the bight portion 36 and the legs 37 and 38 is a handle 41 which is likewise U-shaped in cross sectional area and which is provided through the leg portions thereof adjacent the free ends thereof with drilled openings 42 and 43, the handle 41 extending substantially tangentially from the legs 37 and 38.

The inner wall of the bight portion 36 is serrated, as indicated at 44, and the device is provided with the wire 27 above described with regard to the form of the invention illustrated in Figures 1 to 6, inclusive, in this instance, however, extending through the drilled openings 42 and 43 in the handle 41.

In this form of the invention, it will be apparent that when it is desired to secure the cable 12 to the battery post 11, it is only necessary to insert the terminal member 32 between the legs 37 and 38 of the locking member 35 in such manner that openings 39, 40 and 33 are in vertical alignment whereupon the post may be inserted through such openings after which the handle 41 may be moved in a clockwise direction as viewed in Figure 8. This action will cause the serrated portion 44 to lock with the serrated portion 34 of the terminal while at the same time binding the inner walls of the openings 39 and 40 against the post 11 due to their eccentricity. To unlock the cable 12 from the post 11, it is merely necessary to reverse this process, that is to say, to move the handle 41 in a counterclockwise direction.

While but two forms of the invention have been shown and described herein, it will be readily apparent to those skilled in the art that many minor modifications of the invention may be made without departing from the spirit of the invention or the scope of the appended claim.

What is claimed is:

A device of the character described comprising, in combination with a battery terminal post and a cable, the provision of a U-shaped terminal for said cable having a bight portion attached to said cable and a pair of substantially circular spaced legs each having a centrally disposed opening for receiving said post therethrough, a locking member provided with a circular head and an integrally formed handle, said head adapted to be inserted between said legs and having an eccentric opening for receiving said post therethrough, said bight portion having a serrated inner face and said head having a serrated edge portion adapted to engage the serrations in the bight portion, and an endless retaining wire interconnecting said cable and said handle.

MELVIN O. NELSON.

References Cited in the file of this patent
UNITED STATES PATENTS

| Number | Name | Date |
|---|---|---|
| 1,805,857 | Trimble | May 19, 1931 |
| 2,098,091 | Gamble | Nov. 2, 1937 |
| 2,125,579 | O'Brien | Aug. 2, 1938 |